United States Patent

[11] 3,575,606

[72] Inventor Robert E. Bledsoe
Miami, Fla.
[21] Appl. No. 818,982
[22] Filed Apr. 24, 1969
[45] Patented Apr. 20, 1971
[73] Assignee G B Instruments, Inc.
Hollywood, Fla.

[54] CONTROLLED RANDOM PULSE GENERATOR
6 Claims, 2 Drawing Figs.

[52] U.S. Cl. .......... 307/106, 331/78
[51] Int. Cl. .......... H03k 3/82
[50] Field of Search .......... 307/106, 108, 132, 27 (X); 328/59 (X), 63; 331/78 (X)

[56] References Cited
UNITED STATES PATENTS

| | | | |
|---|---|---|---|
| 2,767,315 | 10/1956 | Kosten .......... | 328/59X |
| 3,205,454 | 9/1965 | Lowe .......... | 331/78 |
| 3,427,478 | 2/1969 | Etter .......... | 307/271 |

*Primary Examiner*—Robert K. Schaefer
*Assistant Examiner*—William J. Smith
*Attorney*—Pennie, Edmonds, Morton, Taylor and Adams

ABSTRACT: A controlled random pulse generator which includes a variable-frequency voltage-controlled oscillator, a gate circuit for sampling the output signal of a ratio oscillator to produce a random amplitude voltage for controlling the pulse periodicity of the voltage-controlled oscillator. Circuit means are provided for controlling the minimum and maximum periods of the random output pulses.

INVENTOR
Robert E. Bledsoe
BY Pennie, Edmonds, Morton, Taylor and Adams
ATTORNEYS

CONTROLLED RANDOM PULSE GENERATOR

BACKGROUND OF THE INVENTION

1. Field of the Invention

This invention relates to generators for producing randomly spaced electrical pulses wherein the time periods between successive pulses randomly vary between predetermined minimum and maximum limits.

2. Prior Art

Random pulse generators proposed in the prior art have generally employed a so-called white-noise generator as a source for producing pulses that occur at unpredictable rates. Experience with these generators has shown that it is difficult to provide circuit means that will reliably control the minimum and maximum periods and still maintain a completely random output within the desired predetermined limits. Where separate timing circuits are employed to define the respective minimum and maximum periods, it has been found that the distribution of time periods is upset favoring one or both of the extreme periods.

SUMMARY OF THE INVENTION

It is an object of the present invention to provide a relatively simple pulse generator which is capable of producing completely random output pulses within a predetermined range of minimum and maximum periods, each period being independent of the preceding period. In the preferred embodiment, circuit means are provided for independently controlling the minimum and maximum periods.

In accordance with the invention, a variable period pulse generator is provided in combination with a separate ratio oscillator which produces a varying amplitude control voltage that is utilized to modulate the time period between succeeding output pulses. A gate circuit under control of the generator output pulses is provided to sample the output voltage of the ratio oscillator and produce a random amplitude voltage which controls the time period between successive pulses of the variable period pulse generator. Control of the distribution of pulse periods within the predetermined maximum and minimum limits may be readily varied by simply changing the output voltage waveshape of the ratio oscillator. Using a linear sawtooth voltage, for example, the distribution of pulse periods will be linear from minimum to maximum. If, on the other hand, the waveshape is modified to appear as one-quarter of a sine wave, fewer short period pulses and more long period pulses will be generated.

Other objects and advantages of the present invention will become apparent from the following detailed description of the invention considered in conjunction with the drawing in which:

DETAILED DESCRIPTION OF THE PREFERRED EMBODIMENT

Figure 1:
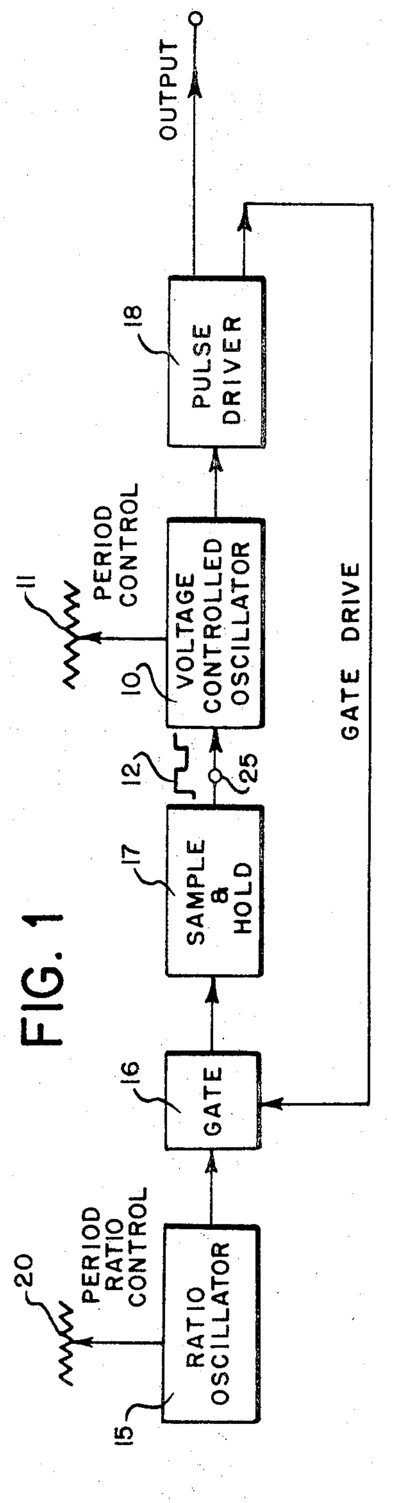
FIG. 1 is a simplified block diagram of a random pulse generator provided in accordance with the invention.

Referring to FIG. 1, voltage-controlled oscillator 10 is provided to generate pulses having time periods that vary between predetermined minimum and maximum limits. Adjustable control 11 is provided for setting the minimum period between successive pulses generated by oscillator 10 and a randomly varying control voltage 12, generated by ratio oscillator 15, gate 16 and sample and hold circuit 17, is supplied to the control terminal 25 of 10 to modulate the periods between successive pulses.

The voltage output of ratio oscillator 15, which runs asynchronously with respect to oscillator 10, is repetitively sampled each time gate 16 is energized by output pulses from oscillator 10 supplied via pulse driver 18. Since the output of oscillator 15 varies asynchronously between minimum and maximum voltage values with respect to the output pulses of oscillator 10, the voltage supplied to sample and hold circuit 17 is a random value that varies between the minimum and maximum values generated by 15.

Period ratio control 20 is advantageously provided to adjust the amplitude of the oscillations generated by 15 which enables the ratio of maximum to minimum periods of the output pulses to be controlled and preset by the operator. When control 20 is set for minimum, the oscillation amplitude is reduced to a constant DC voltage. As control 20 is increased, the output oscillates between the DC voltage and a new upper limit. Thus for a given setting of period control 11, the period of oscillation for 10 is determined by the amplitude of voltage 12.

Period control 11 is advantageously calibrated to make possible the setting of minimum periods and control 20 is calibrated in ratio units times the selected minimum period. For example, if random pulses are desired with periods ranging from 1 to 4 seconds, the period control 11 would be set to 1 second and the ratio control to 4:1.

Since each new pulse period is determined by the output voltage of oscillator 15 at the time of sampling, the relative distribution of long versus short pulse periods will be the same as the voltage distribution of the waveform generated by the oscillator 15. If the waveform is linear with respect to time (i.e., sawtooth or triangular), the distribution can be simply controlled by modifying the output voltage waveform of 15. By changing the waveform to one-quarter of a sine wave, for example, the percentage of longer duration time periods between pulses can be increased and the short periods decreased.

Figure 2:
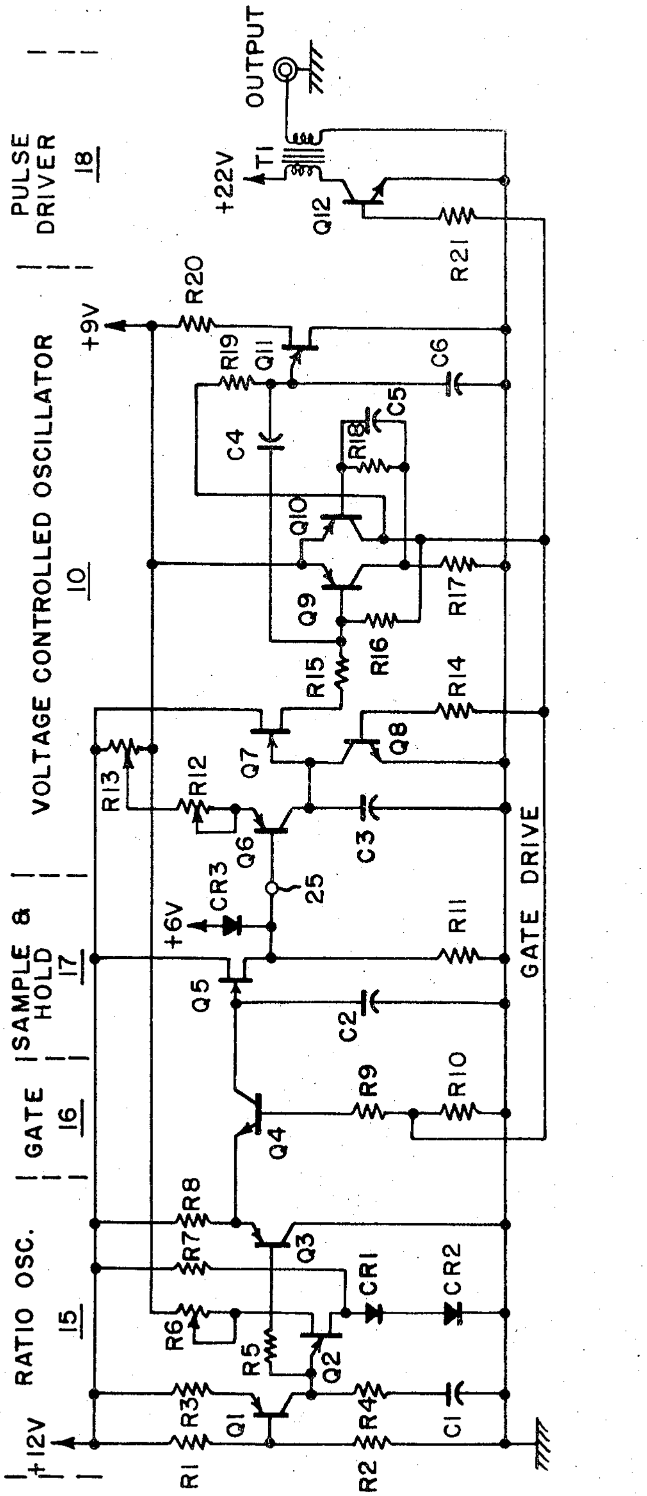
FIG. 2 is a schematic diagram of the random pulse generator illustrated in the block diagram of FIG. 1.

Shown in FIG. 2 is a schematic diagram of a solid-state random pulse generator with like sections being identified by the corresponding numerals in FIG. 1. Ratio oscillator 15 comprises a unijunction transistor Q2 operating as a relaxation oscillator with Q1 functioning as a constant current supply to charge capacitor C1 at a linear ramp. Variable resistor R6 is provided to control the voltage at which Q1 fires and functions as the period ratio control. By adjusting R6, the range of output voltages of Q2 can be changed from a constant DC value (clamped-off condition) to a maximum sawtooth peak value when R6 is shorted out.

Transistor Q3 is an emitter follower that is provided to isolate the emitter of Q2 from the relatively low impedance of gate Q4. When Q4 is turned on by gate drive pulses supplied to the junction of R9 and R10, the charge on capacitor C2 is changed so that its voltage matches the instantaneous voltage on the emitter of Q3 which in turn follows the linear ramp voltage produced at the emitter of Q2.

Field effect transistor Q5 functions as a source follower and drives the control input terminal 25 and the base of Q6 with the voltage held on C2 without discharge of C2. Transistor Q6 and variable resistor R12 function as a variable constant current source for linearly charging C3 at some linear ramp. R12 is used to control the charge of C3 and may be adjusted to set the minimum period of oscillator 10. Variable resistor R13 is an adjustable bias control.

During the charge cycle for C3, transistor Q8 is turned off and Q7, functioning as a source follower, is back biased with its source being clamped by the base of Q9. Transistors Q9 and Q10 function cooperatively as a flip-flop, Q9 being the normally conducting side. As the voltage on C3 continually increases, the gate of Q7 pulls the source of Q7 more positive than the +9 volts and the current through R15 back biases the base of Q9 causing the flip-flop to toggle. When Q10 is saturated, it drives Q8 to conduction resulting in the discharge of C3 back to 0 volts and at the same time drives gate transistor Q4 which establishes a new voltage on C2 as provided by Q3. Transistor Q10 also turns on transistor Q12 which drives pulse transformer T1 to generate the output pulse.

The collector of Q10 is also connected to the emitter of Q11 and capacitor C6, the charge of which is time delayed. When the charge on C6 reaches a sufficient positive value, Q11 is triggered and a resultant negative pulse is coupled through C4 to the base of Q9 triggering Q9 back on, thereby toggling the flip-flop back to the normal condition. The time constant of the Q11 unijunction relaxation oscillator is made short (e.g. 25 microseconds) compared to the cycle time of the pulse generator.

When the flip-flop Q9, Q10 is toggled back to the normal condition, Q10 is cut off resulting in the cutoff of both Q8 and gate Q4. The newly established voltage on C2 and the gate of Q5 establishes a new voltage on the base of Q6 which in turn determines the new charging current to C3 and thus the time period in which Q7 turns Q9 off to generate a new pulse.

A preferred embodiment of the present invention has been described as illustrated in the drawing. It will be appreciated that various changes may be made within the scope of the invention as defined by the claims.

I claim:

1. Apparatus for generating a sequence of electrical pulses wherein each successive pulse randomly occurs within predetermined minimum and maximum time periods following the occurrence of the immediately preceding pulse, said apparatus comprising:

a. voltage-controlled oscillator means for generating electrical output pulses, said oscillator having a control input terminal for receiving a varying amplitude control voltage for varying the time periodicity of said output pulses;

b. separate oscillator means for periodically generating a varying amplitude ratio control voltage;

c. circuit means for randomly sampling said ratio control voltage including a gate actuated by said output pulses to produce a random amplitude control voltage; and d. circuit means for connecting said random amplitude control voltage to the control input terminal of said voltage-controlled oscillator.

2. Apparatus for generating a sequence of electrical pulses wherein each successive pulse randomly occurs within predetermined minimum and maximum time periods following the occurrence of the immediately preceding pulse, said apparatus comprising:

a. voltage-controlled oscillator means for generating electrical output pulses, said oscillator having a control input terminal for receiving a varying amplitude control voltage for varying the time periodicity of said output pulses;

b. separate oscillator means for periodically generating a varying amplitude ratio control voltage;

c. circuit means for randomly sampling said ratio control voltage including gate means actuated by said output pulses to produce a random amplitude control voltage with circuit means for holding the control voltage for the time period between successive pulses; and d. circuit means for connecting said random amplitude control voltage to the control input terminal of said voltage-controlled oscillator.

3. Apparatus in accordance with claim 1 characterized in that adjustable means are provided for controlling the peak amplitude of the control voltage signal generated by said ratio oscillator.

4. Apparatus in accordance with claim 1 characterized in that adjustable means independent of the voltage control input terminal are provided for controlling the pulse repetition period of the voltage-controlled oscillator.

5. Apparatus in accordance with claim 2 characterized in that adjustable means are provided for controlling the peak amplitude of the control voltage signal generated by said ratio oscillator.

6. Apparatus in accordance with claim 2 characterized in that adjustable means independent of the voltage control input terminal are provided for controlling the pulse repetition period of the voltage-controlled oscillator.

PO-1050
(5/69)

UNITED STATES PATENT OFFICE
CERTIFICATE OF CORRECTION

Patent No. 3,575,606 Dated April 20, 1971

Inventor(s) Robert E. Bledsoe

It is certified that error appears in the above-identified patent and that said Letters Patent are hereby corrected as shown below:

Column 2, lines 28-29, "triangular), the distribution can be simply" should read -- triangular), the distribution of periods is likewise linear The desired distribution can be simply --.

Signed and sealed this 31st day of August 1971.

(SEAL)
Attest:

EDWARD M.FLETCHER,JR.
Attesting Officer

WILLIAM E. SCHUYLER, JR.
Commissioner of Patents